US011008721B2

United States Patent
Chen et al.

(10) Patent No.: US 11,008,721 B2
(45) Date of Patent: May 18, 2021

(54) SQUID-TYPE MARINE OIL CONTAINMENT DEVICE

(71) Applicants: Zhejiang Ocean University, Zhejiang (CN); Wuhan Yunzhou Technology Service Co., Ltd, Hubei (CN)

(72) Inventors: Lin Chen, Zhejiang (CN); Junmin Mou, Hubei (CN); Mengxia Li, Hubei (CN); Linying Chen, Hubei (CN); Pengfei Chen, Hubei (CN); Huaming Wang, Zhejiang (CN); Qiaorui Wu, Zhejiang (CN); Zhenhuang Du, Zhejiang (CN)

(73) Assignees: Zhejiang Ocean University, Zhoushan (CN); Wuhan Yunzhou Technology Service Co., Ltd, Wuhan (CN)

( * ) Notice: Subject to any disclaimer, the term of this patent is extended or adjusted under 35 U.S.C. 154(b) by 0 days.

(21) Appl. No.: 16/869,538

(22) Filed: May 7, 2020

(65) Prior Publication Data

US 2020/0354912 A1  Nov. 12, 2020

(30) Foreign Application Priority Data

May 8, 2019 (CN) .......................... 201910379758.3

(51) Int. Cl.
*E02B 15/04* (2006.01)
*B08B 7/00* (2006.01)
(Continued)

(52) U.S. Cl.
CPC .......... *E02B 15/047* (2013.01); *B08B 7/0014* (2013.01); *B63B 35/32* (2013.01);
(Continued)

(58) Field of Classification Search
CPC ........ E02B 15/047; E02B 15/06; E02B 15/08; E02B 15/10; E02B 15/106; B63B 35/32; Y02A 20/204; Y10S 210/923
(Continued)

(56) References Cited

U.S. PATENT DOCUMENTS

| 4,006,082 | A | * | 2/1977 | Irons | ....................... | E02B 15/08 |
| | | | | | | 210/242.3 |
| 5,071,545 | A | * | 12/1991 | Ashtary | .................. | E02B 15/08 |
| | | | | | | 210/242.3 |

(Continued)

FOREIGN PATENT DOCUMENTS

CN  102897292 A   1/2013
FR     2085492    * 12/1971

*Primary Examiner* — Christopher Upton (57) ABSTRACT

A squid-type marine oil containment device includes a track and four oil containment booms. A robotic arm is provided in an elliptic area formed by the track. Sliders are provided on the track. Ends of oil containment booms slide along the track through sliders. Each oil containment boom includes an oil suction pipe, propellers and a plastic separating layer. A middle of the oil suction pipe forms an oil channel. Booster pumps are spacedly provided inside the oil suction pipe and are respectively connected to a hose. Pairs of propellers are spacedly provided at a lower end of the oil suction pipe. Oil suction holes are provided on the oil suction pipe. The plastic separating layer is provided under the oil suction holes. A counterweight is provided at a bottom of the oil containment boom. The invention further provides a method of containing oil using the device.

9 Claims, 8 Drawing Sheets

(51) Int. Cl.
  *B63B 35/32* (2006.01)
  *E02B 15/06* (2006.01)
  *E02B 15/08* (2006.01)
  *E02B 15/10* (2006.01)

(52) U.S. Cl.
  CPC .............. *E02B 15/06* (2013.01); *E02B 15/08* (2013.01); *E02B 15/106* (2013.01)

(58) Field of Classification Search
  USPC ... 210/170.05, 170.09, 170.11, 242.3, 747.6, 210/776, 923
  See application file for complete search history.

(56) References Cited

U.S. PATENT DOCUMENTS

| | | | | |
|---|---|---|---|---|
| 5,169,526 | A * | 12/1992 | Gould | E02B 15/06 210/242.3 |
| 5,387,055 | A | 2/1995 | Jenkins | |
| 6,221,256 | B1 * | 4/2001 | Kimura | E02B 15/06 210/747.6 |
| 8,821,721 | B2 * | 9/2014 | Torres | E02B 15/047 210/170.05 |
| 2003/0062297 | A1 * | 4/2003 | Rosquist | E02B 15/06 210/242.3 |

* cited by examiner

SQUID-TYPE MARINE OIL CONTAINMENT DEVICE

CROSS-REFERENCE TO RELATED APPLICATIONS

This application claims the benefit of priority from Chinese Patent Application No. 201910379758.3, filed on May 8, 2019. The content of the aforementioned application, including any intervening amendments thereto, is incorporated herein by reference in its entirety.

TECHNICAL FIELD

The present application relates to the prevention and control of water pollution, and more particularly to a squid-type marine oil containment device.

BACKGROUND OF THE INVENTION

Waste oil is conventionally recovered using boats in the assistance of oil containment booms, and the recovery principles are described as follows. A command boat and two tugboats arrive at an accident site and then are connected through treated oil containment booms to form a size-controllable V-shaped oil spill containment area. The two tugboats drive the oil containment booms to move on the oil spill sea surface to gradually gather oil spills dispersed on the sea surface. The three boats stop moving forward when the oil film in the oil containment booms has the desired thickness. Subsequently, the command boat is kept stationary and the two tugboats are allowed to gradually approach each other to move and squeeze the oil containment booms for continuously gathering the oil spills, which greatly increases the oil film thickness in the oil spill containment area, allowing an oil skimmer to efficiently perform the recovery in an ideal environment. The V-shaped containment is carried out mainly by running the two tugboats in parallel to drag the oil containment booms, and the size of the containment area is determined according to the length of the oil containment booms and the horsepower of the two tugboats. The two tugboats should follow the instructions of the command boat completely to adjust the course and speed in time while moving in parallel before the command boat, so that the three boats always form a V-shaped area during the movement to contain oil spills as many as possible. After the three boats stop advancing and the two tugboats gradually approach each other, a weir-type oil skimmer is placed and started in the containment area, and at this time, the oil film is thick, which can ensure high-efficiency recovery and less suction of seawater. In the case that there are oil spills large both in area and quantity, it is feasible to send multiple boats to the oil spill sea surface multiple times for the oil spill recovery, however, this method for recovering the marine oil spills generally involves high cost and complicated and burdensome operation due to the need of the cooperation of the three boats.

SUMMARY OF THE INVENTION

An object of this invention is to provide a squid-type marine oil containment device, to overcome the defects of high cost and complicated process in the oil accumulation in the prior art.

Another object of the invention is to provide a method of containing oil using the device.

The technical solutions are described as follows.

A squid-type marine oil containment device, comprising: a track and four oil containment booms; wherein the track and the four oil containment booms are provided on a hull; the track is inwardly wound around edges of a deck to form an elliptic area; a robotic arm is provided in the elliptic area; the track is provided with a plurality of sliders operable to move back and forth along the track; an end of respective oil containment booms slides along the track through respective sliders; respective oil containment booms comprise an oil suction pipe, multiple pairs of electric contra-rotating propellers and a plastic separating layer; a middle of the oil suction pipe forms an oil channel; booster pumps are spacedly provided inside the oil suction pipe and respective booster pumps are connected to a hose; the pairs of electric contra-rotating propellers are spacedly provided at a lower end of the oil suction pipe; a plurality of oil suction holes are provided on the oil suction pipe; the plastic separating layer with a density between that of oil slicks and seawater is provided below the oil suction holes; respective electric contra-rotating propellers are provided in a duct and comprise a hub circumferentially provided with four blades; an end face of the hub is connected to a hub flange; respective electric contra-rotating propellers are directly connected to a power motor; the electric contra-rotating propellers and the booster pumps are connected to an electric cable extending from a bottom of respective oil containment booms; and a counterweight is provided at the bottom of respective oil containment booms to stabilize and balance the oil containment boom in a vertical orientation.

In some embodiments, an oil contamination detector is provided on the oil suction pipe.

In some embodiments, each oil suction hole is provided with a check valve.

In some embodiments, the electric contra-rotating propellers are provided in the duct through a rigid support.

In some embodiments, a plurality of oil grooves are provided on the track, and the sliders are operable to move back and forth on the oil grooves.

In some embodiments, the oil suction pipe is made of polytetrafluoroethylene, which has performances such as good corrosion resistance and low coefficient of friction.

In some embodiments, the hose is a rubber hose, which can control buoyancy to keep the oil suction holes on the water surface, thereby avoiding the excessive suction of seawater to ensure the recovering efficiency of the oil contaminants.

In some embodiments, respective oil containment booms have a length of 100-200 m.

The invention further provides a method for containing oil using the squid-type marine oil containment device, comprising:

(1) placing two oil containment booms at one side of the hull respectively at a front end and a rear end of the hull; placing the other two oil containment booms at the other side of the hull respectively at the front end and the rear end of the hull; running thrusters spacedly provided on respective oil containment booms to straighten the oil containment booms; bending the two oil containment booms at the same side of the hull under the action of the thrusters to allow distal ends thereof to approach each other to form a closed area to perform oil containment; and allowing the two oil containment booms at the same side of the hull to be close to each other to squeeze an oil layer;

(2) switching on an air compressor on the deck to allow the oil suction holes to suck oil contaminants; switching on the booster pump on respective oil containment booms; controlling the thrusters to allow the two oil containment booms at the same side to be closer to each other while continuously recovering the oil contaminants until they are brought together; after the oil contamination detector detects that the oil contaminants have been completely recovered, shutting off the booster pumps and the air compressor in sequence to complete the recovery of the oil contaminants near left and right sides of the hull; and (3) bending the two oil containment booms at the same end of the hull to allow distal ends thereof to be close to each other to squeeze an oil layer; repeating step (2) to complete the recovery of oil contaminants near front and rear ends of the hull; and driving a ship to another site to recover waste oil.

The beneficial effects of this invention are described as follows.

(1) The device disclosed herein is provided with four oil containment booms which are provided with propellers and have controllable movements and a length of hundreds of meters. The oil containment booms are used in pairs, which can contain and suck oil with high efficiency.

(2) For recovering oil contaminants through the oil containment booms, the conventional method requires three boats to cooperate with each other, whereas, the device provided in the invention only utilizes one boat to achieve the oil containment and suction, allowing for a lower cost.

(3) The oil containment booms are connected to the track through the sliders, so the connection mechanism is detachable, which facilitates the maintenance and the arrangement of the oil containment booms on the deck when not needed.

BRIEF DESCRIPTION OF THE DRAWINGS

The accompanying drawings in the embodiments or the prior art will be briefly described below to make the technical solutions of the embodiments or the prior art clearer. It is obvious that the accompanying drawings below are merely illustrative, and any other accompanying drawings can be made by those skilled in the art based on the accompanying drawings disclosed herein without sparing any creative efforts.

In the drawings: 1, electric contra-rotating propellers; 10, duct; 11, hub; 12, hub flange; 13, blades; 14, power motor; 15, rigid support; 2, oil containment boom; 21, hose; 22, booster pump; 23, oil contaminant detector; 24, check valve; 25, oil suction holes; 26, plastic separating layer; 27, counterweight; 3, sliders; 4, robotic arm; 5, track; 51, oil grooves; 6, oil channel; and 7, electric cable.

DETAILED DESCRIPTION OF EMBODIMENTS

The invention will be further described below in detail with reference to the accompanying drawings to clearly and fully illustrate the technical solutions of the embodiments. It is apparent that the embodiments below are merely preferred embodiments of the invention and are not intended to limit the invention. Any other embodiments made by those skilled in the art based on the embodiments disclosed herein without sparing any creative efforts should fall within the scope of the invention.

The invention provides a squid-type marine oil containment device, as shown in FIGS. 1, 11, 12 and 17, including a track 5 and four oil containment booms 2, where the track 5 and the four oil containment booms 2 are provided on a hull. The track 5 is inwardly wound around edges of a deck to form an elliptic area. A robotic arm 4 is provided in the elliptic area. The track 5 is provided with a plurality of sliders 3 operable to move back and forth along the track. An end of respective oil containment boom 2 slides along the track 5 through respective sliders 3. Respective oil containment booms 2 include an oil suction pipe, multiple pairs of electric contra-rotating propellers 1 and a plastic separating layer 26. A middle of the oil suction pipe forms an oil channel 6. Booster pumps 22 are spacedly provided inside the oil suction pipe and each booster pump 22 is connected to a hose 21. The pairs of electric contra-rotating propellers 1 are spacedly provided at a lower end of the oil suction pipe. A plurality of oil suction holes 25 are provided on the oil suction pipe. The plastic separating layer 26 with a density between that of oil slicks and seawater is provided below the oil suction holes 25. Each electric contra-rotating propeller 1 is provided in a duct 10 and includes a hub 11 circumferentially provided with four blades 13. An end face of the hub 11 is connected to a hub flange 12. Respective electric contra-rotating propeller 1 is directly connected to a power motor 14. The electric contra-rotating propellers 1 and the booster pumps 22 are connected to an electric cable 7 extending from a bottom of respective oil containment booms 2. A counterweight 27 is provided at the bottom of respective oil containment booms 2 to stabilize and balance the oil containment boom 2 in a vertical orientation.

Figure 11:
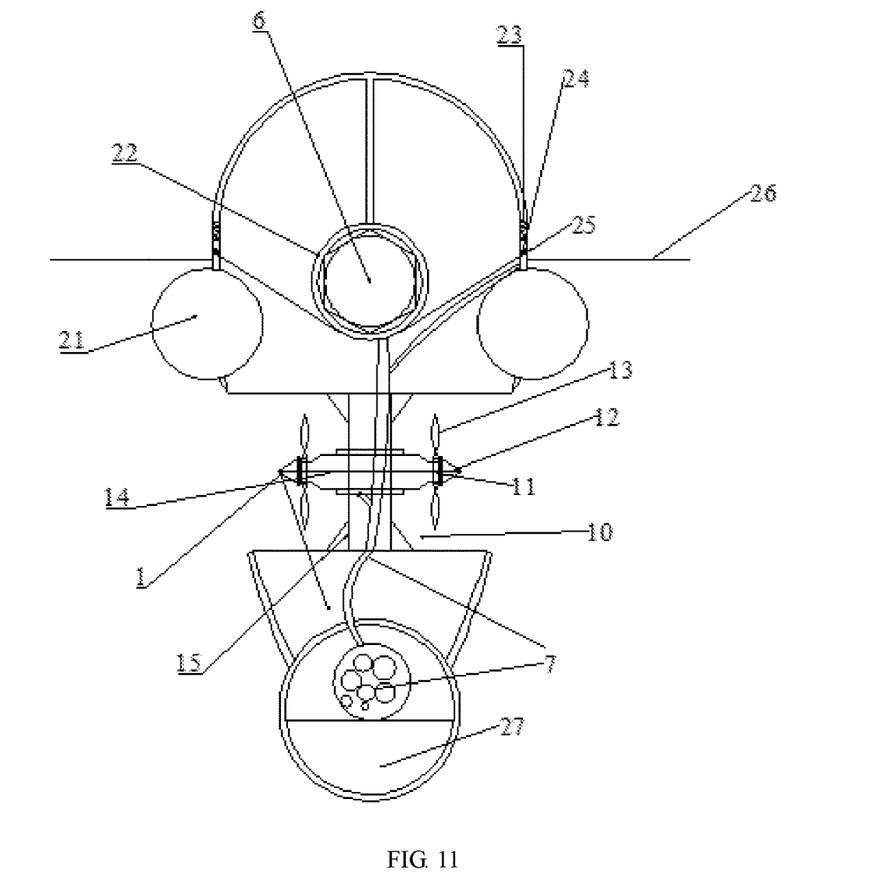
FIG. 11 is a schematic diagram of oil containment booms according to an embodiment of the invention.

Further, an oil contamination detector 23 is provided on the oil suction pipe.

Further, each oil suction hole 25 is provided with a check valve 24.

Figure 12:
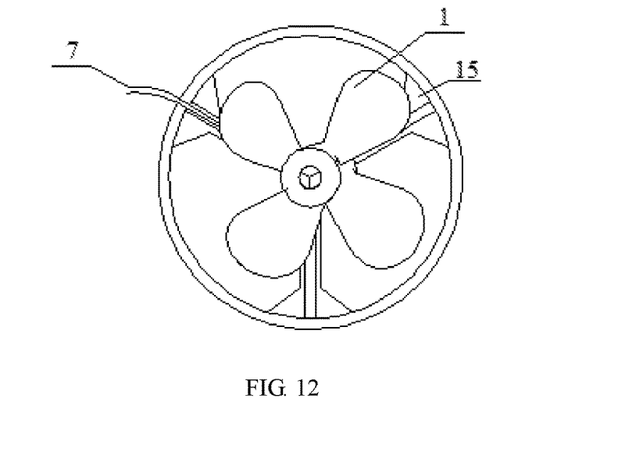
FIG. 12 schematically shows the installation of propellers.

Further, the electric contra-rotating propellers 1 are provided in the duct 10 through a rigid support 15.

Figure 17:
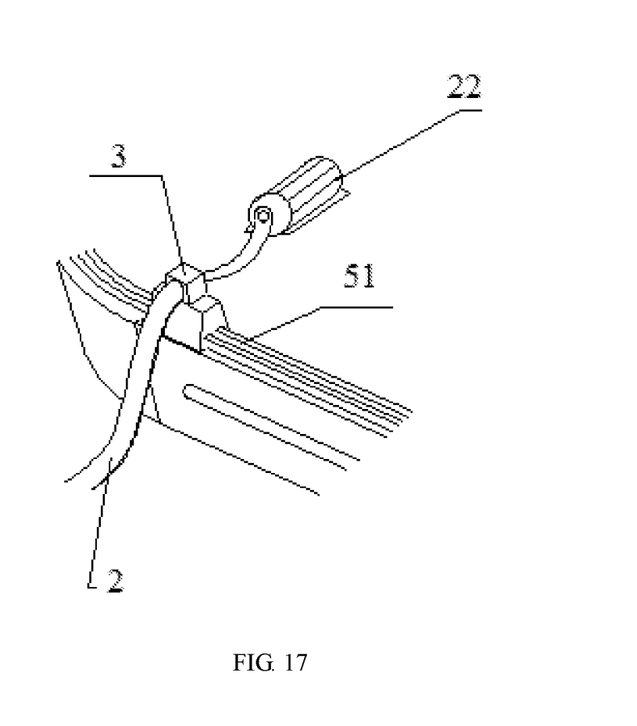
FIG. 17 schematically shows the arrangement of a slider on a track.

Further, a plurality of oil grooves 51 are provided on the track 5, and the sliders 3 are operable to move back and forth on the oil grooves 51.

Further, the oil suction pipe is made of polytetrafluoroethylene, which has performances such as good corrosion resistance and low coefficient of friction.

Further, the hose 21 is a rubber hose, which can control buoyance to keep the oil suction holes 25 on the water surface, thereby avoiding the excessive suction of seawater to ensure the recovering efficiency of the oil contaminants.

Further, oil containment booms 2 have a length of 100-200 m.

Figure 1:
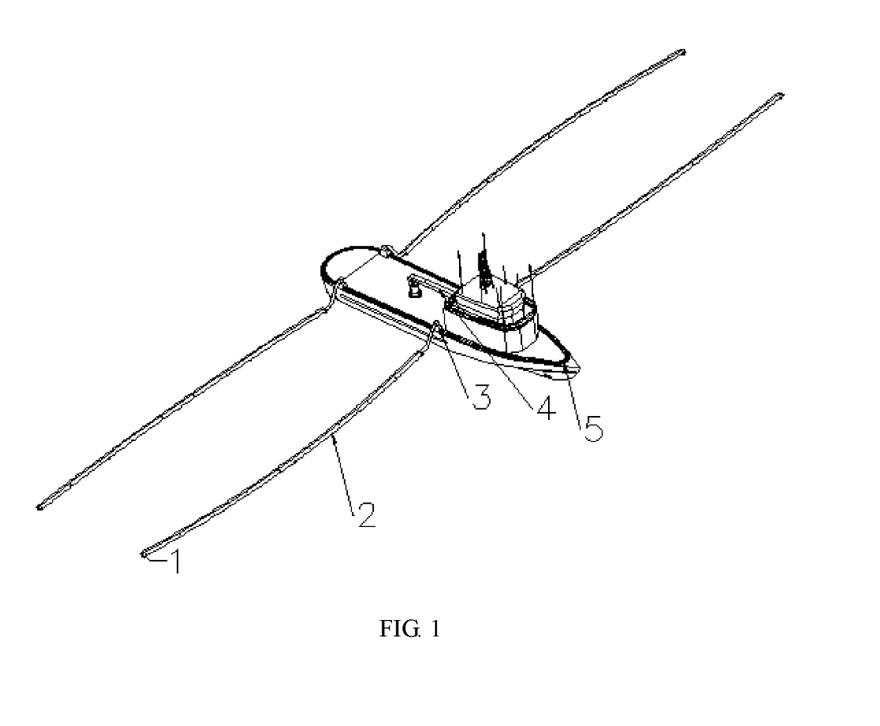
FIG. 1 is a schematic diagram of a squid-type marine oil containment device of the invention.
Figure 2:
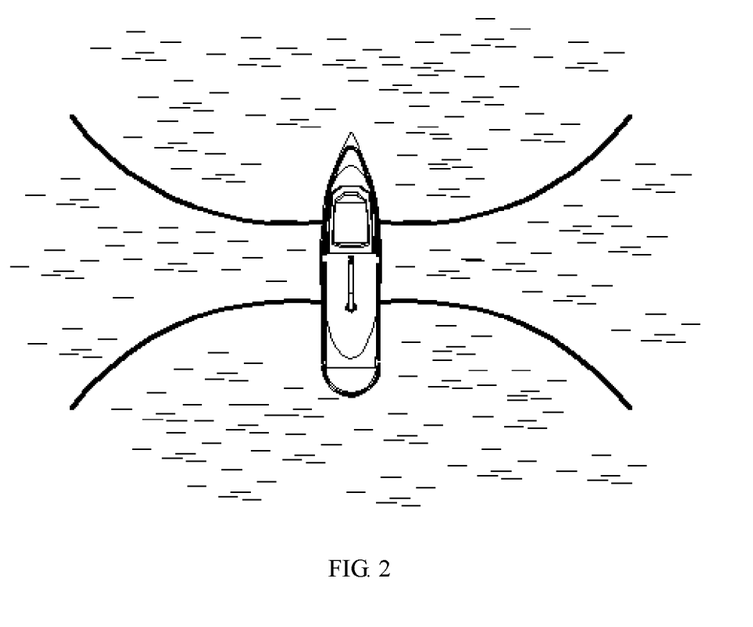
FIGS. 2-10 schematically show processes of recovering oil contaminants through the device.
Figure 3:
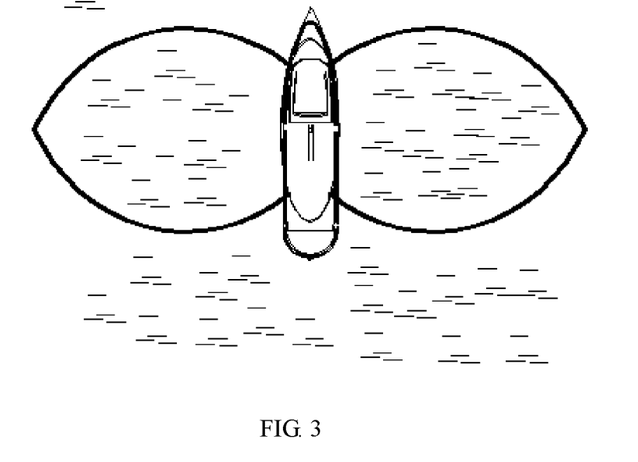
Figure 4:
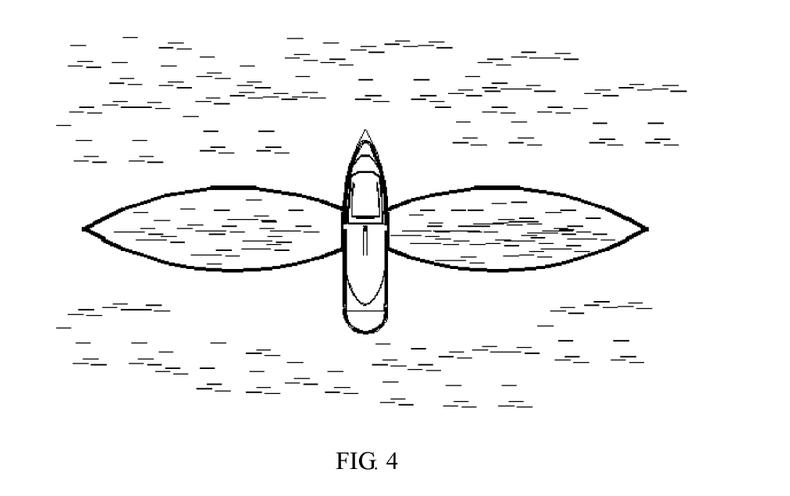
Figure 5:
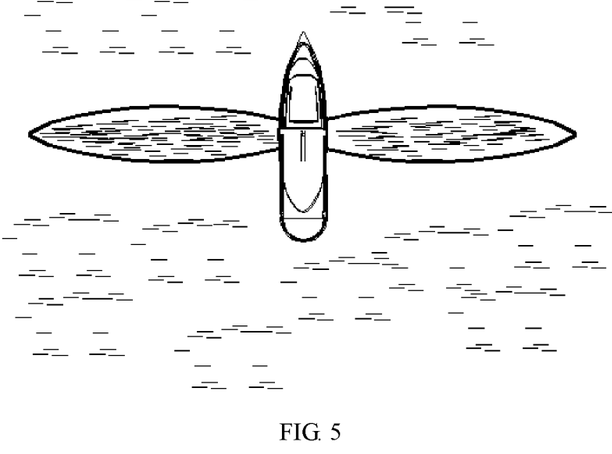
Figure 6:
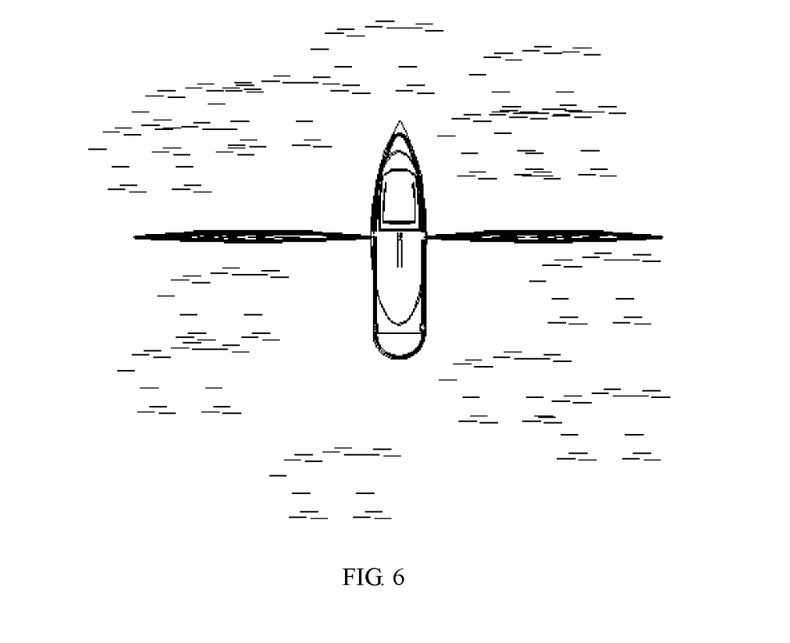
Figure 7:
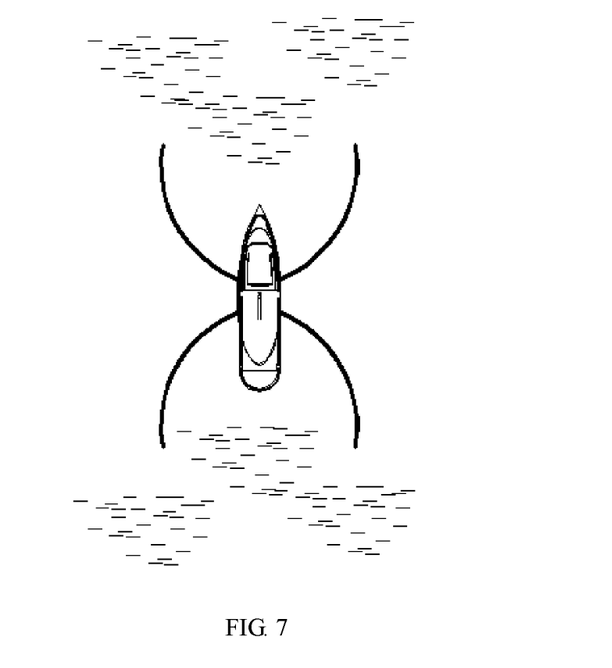
Figure 8:
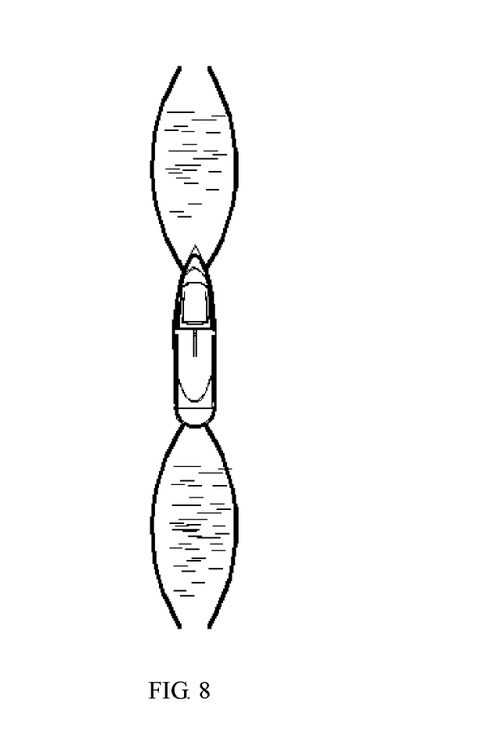
Figure 9:
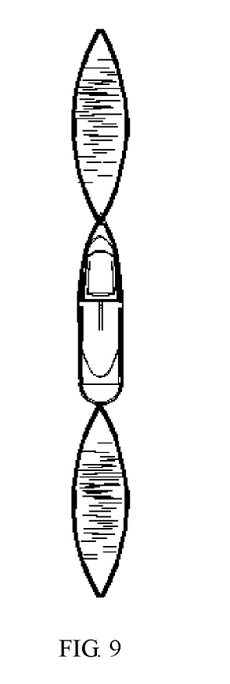
Figure 10:
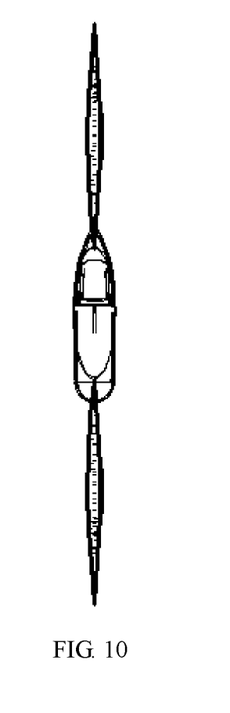

Two adjacent oil containment booms 2 on the hull can cooperate with each other to complete the oil containment. The processes of operating the device of the invention are described as follows. In the event of a marine oil spill, a boat provided with the device of the invention is sent to the oil spill site. As shown in FIG. 2, the boat is surrounded by oil contaminants at the oil spill area, and at this time, the four oil containment booms 2 on the boat outwardly extend to the maximum extent to trap and recover oil as much as possible. Next, distal ends of two adjacent oil containment booms 2 at the same side are controlled to approach each other to form a closed area to maximally contain the oil contaminants on both sides of the boat. The thrusters in a middle of respective oil containment booms are controlled, as shown in FIG. 3, to allow the two adjacent oil containment booms 2 to further approach each other. As the two adjacent oil containment booms 2 move toward each other to squeeze the closed areas, oil spills are continuously gathered to greatly increase the oil film thickness in an oil spill containment area, which enables the oil suction holes 25 to efficiently recover oil slicks blocked by the four oil containment booms 2. During the recovery, the oil contaminants are surrounded by the four oil containment booms 2 just like arms. This containment process is just like the way that a squid hunts prey. The oil contaminants in the oil spill area are squeezed, as shown in FIGS. 4 and 5, to increase the proportion of the oil contaminants in every cubic meter of seawater, which is conducive to the oil suction performed by the oil suction holes 25, avoiding the excessive suction of seawater to ensure the recovering efficiency of the oil contaminants. After squeezing the oil layer, an air compressor on the deck is switched on to allow the oil suction holes 25 to suck the oil contaminants. When a certain quantity of the oil contaminants is detected in the oil suction pipe, the booster pumps on respective oil containment booms are turned on. The more oil contaminants are recovered, the thinner the surrounded oil contaminant layer is. The thrusters are controlled to make the two adjacent oil containment booms 2 further approach each other until they are brought together, as shown in FIG. 6. After the oil contaminant detector 23 indicates that the oil contaminants are completely recovered, the booster pumps 22 and the air compressor are shut off in sequence to complete the recovery of most oil contaminants near the left and right sides of the hull. However, there are still a considerable number of oil contaminants near the bow and stern of the boat, as shown in FIG. 7, the recovery thereof requires the cooperation of the two oil containment booms 2 at the same end of the hull to repeat the processes mentioned above. Through the thrusters, the four oil containment booms 2 are controlled to contain and recover the oil contaminants, as shown in FIGS. 8-10. After the recovery of the oil contaminants is completed, the boat is driven to another area to perform oil suction.

Figure 13:
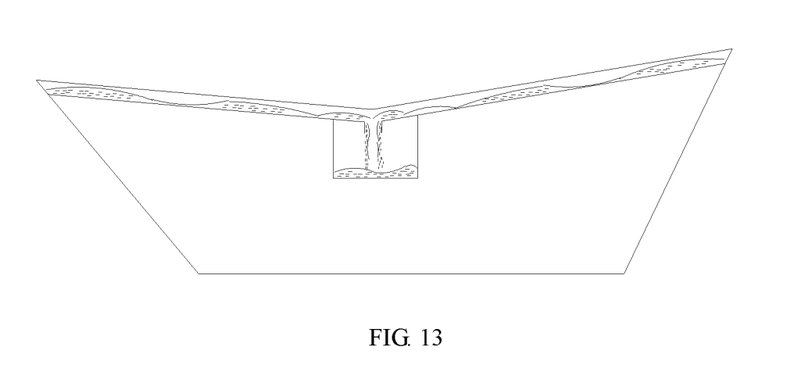
FIG. 13 schematically shows the flowing of oil-water mixtures into a tank.
Figure 14:
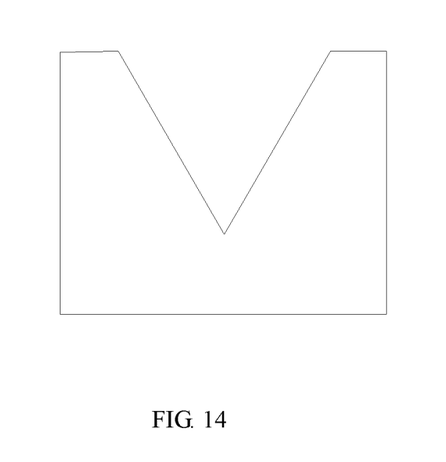
FIGS. 14-16 are cross-sectional views of various shapes of oil grooves.
Figure 15:
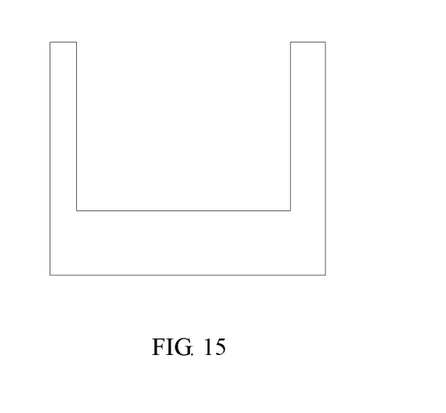
Figure 16:
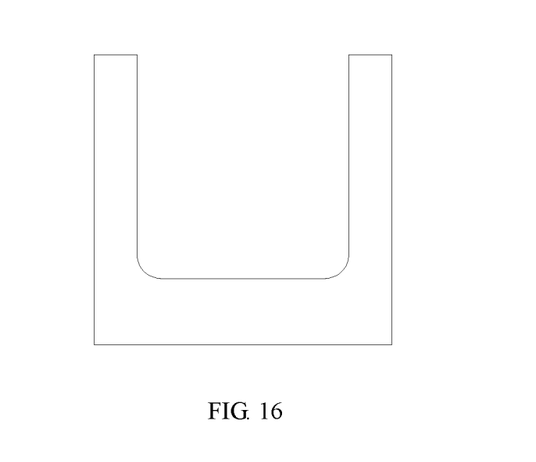

The oil-water mixtures are recovered to the deck and then enter the oil grooves 51, as shown in FIG. 17. Various shapes of the oil grooves 51 shown in FIGS. 14-16, are appropriate, since these shapes are conducive to gathering the oil contaminants at a bottom of respective oil grooves. The air compressor is connected to the oil containment booms 2 on the sliders 3 which controllably move on the track 5. The boat used herein for recovering the oil contaminants has a small-to-medium size, and the deck thereof has a structure in which the bow and stern are higher than a middle of the boat, as shown in FIG. 13. The extracted oil-water mixtures automatically flow, under the action of gravity, into an oil tank in the middle of the boat.

In order to ensure the continuous operation of the device of the invention, an oil extractor is utilized to continuously transfer the recovered oil slicks. However, the device is too long to ensure the pumping efficiency and the oil pumping force, and thus the booster pumps 22 are spacedly provided in the oil suction pipe to assist the oil pumping, improving the oil pumping efficiency. Multiple pairs of electric contra-rotating propellers 1 are spacedly provided at the lower end of the oil suction pipe, and the electric contra-rotating propeller 1 can be remotely controlled to adjust the device of the invention according to practical needs.

Described above are merely preferred embodiments of the invention, which are not intended to limit the invention. Any modifications, replacements and improvements made without departing from the spirit of the invention shall fall within the scope of the invention.

What is claimed is:

1. A squid-type marine oil containment device, comprising a track and four oil containment booms;
   wherein the track and the four oil containment booms are provided on a hull; the track is inwardly wound around edges of a deck to form an elliptic area; a robotic arm is provided in the elliptic area; the track is provided with a plurality of sliders operable to move back and forth along the track; an end of respective oil containment booms slides along the track through respective sliders; each oil containment boom comprises an oil suction pipe, multiple pairs of electric contra-rotating propellers and a plastic separating layer; a middle of the oil suction pipe forms an oil channel; booster pumps are spacedly provided inside the oil suction pipe and booster pumps each are connected to a hose; the pairs of electric contra-rotating propellers are spacedly provided at a lower end of the oil suction pipe; a plurality of oil suction holes are provided on the oil suction pipe; the plastic separating layer with a density between that of oil slicks and seawater is provided below the oil suction holes; respective electric contra-rotating propellers are provided in a duct and comprise a hub circumferentially provided with four blades; an end face of the hub is connected to a hub flange; respective electric contra-rotating propellers are directly connected to a power motor; the electric contra-rotating propellers and the booster pumps are connected to an electric cable extending from a bottom of the oil containment booms; and a counterweight is provided at the bottom of the oil containment booms to stabilize and balance the oil containment boom in a vertical orientation.

2. The squid-type marine oil containment device of claim 1, wherein an oil contamination detector is provided on the oil suction pipe.

3. The squid-type marine oil containment device of claim 1, wherein each oil suction hole is provided with a check valve.

4. The squid-type marine oil containment device of claim 1, wherein the electric contra-rotating propellers are provided in the duct through a rigid support.

5. The squid-type marine oil containment device of claim 1, wherein a plurality of oil grooves are provided on the track, and the sliders are operable to move back and forth on the oil grooves.

6. The squid-type marine oil containment device of claim 1, wherein the oil suction pipe is made of polytetrafluoroethylene.

7. The squid-type marine oil containment device of claim 1, wherein the hose is a rubber hose.

8. The squid-type marine oil containment device of claim 1, wherein each oil containment boom has a length of 100-200 m.

9. A method for containing oil using the squid-type marine oil containment device of claim 1, comprising:
   (1) placing two oil containment booms at one side of the hull respectively at a front end and a rear end of the hull; placing the other two oil containment booms at the other side of the hull respectively at the front end and the rear end of the hull; running thrusters spacedly provided on respective oil containment booms to straighten the oil containment booms; bending the two oil containment booms at the same side of the hull under the action of the thrusters to allow distal ends thereof to approach each other to form a closed area for oil containment; and allowing the two oil containment booms at the same side of the hull to be close to each other to squeeze an oil layer;

(2) switching on an air compressor on the deck to allow the oil suction holes to suck oil contaminants; switching on the booster pump on respective oil containment booms; controlling the thrusters to allow the two oil containment booms at the same side to be closer to each other while continuously recovering the oil contaminants until they are brought together; after an oil contamination detector detects that the oil contaminants have been completely recovered, shutting off the booster pumps and the air compressor in sequence to complete the recovery of the oil contaminants near left and right sides of the hull; and (3) bending the two oil containment booms at the same end of the hull to allow distal ends thereof to be close to each other to squeeze an oil layer; repeating step (2) to complete the recovery of oil contaminants near front and rear ends of the hull; and driving a ship to another site to recover waste oil.

* * * * *